US011067425B2

(12) United States Patent
Squires

(10) Patent No.: US 11,067,425 B2
(45) Date of Patent: Jul. 20, 2021

(54) WIRING INTERFACE FOR FLUID SENSORS

(71) Applicant: Scully Signal Company, Wilmington, MA (US)

(72) Inventor: Charles F. Squires, Waltham, MA (US)

(73) Assignee: Scully Signal Company, Wilmington, MA (US)

( * ) Notice: Subject to any disclaimer, the term of this patent is extended or adjusted under 35 U.S.C. 154(b) by 0 days.

(21) Appl. No.: 16/588,215

(22) Filed: Sep. 30, 2019

(65) Prior Publication Data
US 2020/0132532 A1    Apr. 30, 2020

Related U.S. Application Data

(63) Continuation of application No. 15/573,007, filed as application No. PCT/US2016/031990 on May 12, 2016, now Pat. No. 10,429,226.

(60) Provisional application No. 62/160,101, filed on May 12, 2015.

(51) Int. Cl.
*G01F 23/26*    (2006.01)
*B60P 3/22*    (2006.01)
(Continued)

(52) U.S. Cl.
CPC .............. *G01F 23/26* (2013.01); *B60P 3/228* (2013.01); *B67D 7/362* (2013.01); *B67D 7/78* (2013.01);
(Continued)

(58) Field of Classification Search
None
See application file for complete search history.

(56) References Cited

U.S. PATENT DOCUMENTS

| 4,846,701 A | 7/1989 | Hayes et al. |
| 5,349,994 A * | 9/1994 | Koeninger .............. B67D 7/08 137/351 |

(Continued)

FOREIGN PATENT DOCUMENTS

| WO | 2014120005 A1 | 8/2014 |
| WO | 2014120006 A1 | 8/2014 |

OTHER PUBLICATIONS

PCT Search Report and Written Opinion for PCT Application No. PCT/US2016/031990 dated Aug. 9, 2016, 10 pages.
(Continued)

*Primary Examiner* — Paul M. West
*Assistant Examiner* — Mark A Shabman
(74) *Attorney, Agent, or Firm* — Finch & Maloney PLLC

(57) ABSTRACT

A cap for a fluid sensor is provided. The cap comprises a cap input port including a first toolless connector configured to removably couple to a cable; and a cap output port including a second toolless connector configured to removably couple to a cable. The cap may further comprise an interface circuit including a circuit input port, a circuit output port, and a sensor port configured to couple to the fluid sensor. The first toolless connector may be configured to removably couple the circuit input port to a cable and the second toolless connector may be configured to removably couple the circuit output port to a cable. The circuit will automatically sequence the signals on the cable, so standard one-to-one wired cables can be used.

19 Claims, 8 Drawing Sheets

(51) Int. Cl.
    *B67D 7/36*     (2010.01)
    *B67D 7/78*     (2010.01)
    *G01D 21/00*     (2006.01)
    *G01F 23/00*     (2006.01)
    *B60K 15/03*     (2006.01)
    *H01R 13/66*     (2006.01)

(52) U.S. Cl.
    CPC ......... *G01D 21/00* (2013.01); *G01F 23/0061* (2013.01); *B60K 2015/03203* (2013.01); *H01R 13/6658* (2013.01)

(56) References Cited

U.S. PATENT DOCUMENTS

| | | | |
|---|---|---|---|
| 6,382,240 | B1 | 5/2002 | MacDonald |
| 6,468,092 | B1 * | 10/2002 | Graff ................... F15B 13/0839 439/218 |
| 6,523,404 | B1 | 2/2003 | Murphy et al. |
| 8,051,882 | B2 | 11/2011 | Koeninger et al. |
| 8,500,412 | B2 | 8/2013 | Williams et al. |
| 8,593,290 | B2 | 11/2013 | Hunter et al. |
| 8,653,365 | B1 | 2/2014 | Mixon |
| 8,678,050 | B2 | 3/2014 | Dobson et al. |
| 2004/0002256 | A1 | 1/2004 | Bauemieister et al. |
| 2010/0185334 | A1 | 7/2010 | Trottier et al. |
| 2018/0120142 | A1 | 5/2018 | Squires |

OTHER PUBLICATIONS

"Opti-Link Overfill Detection System", Civacon, part of the OPW Fluid Transfer Group, 2015, 4 pages.

India Examination Report for Application No. 201717041565 dated Nov. 25, 2020, 10 pages.

\* cited by examiner

WIRING INTERFACE FOR FLUID SENSORS

RELATED APPLICATIONS

This application claims priority under 35 U.S.C. § 120 as a continuation of U.S. patent application Ser. No. 15/573,007, titled "WIRING INTERFACE FOR FLUID SENSORS," filed Nov. 9, 2017, which claims priority under 35 U.S.C. § 371 as a national stage application of PCT Application No. PCT/US2016/031990, titled "WIRING INTERFACE FOR FLUID SENSORS," filed May 12, 2016, which claims priority under 35 U.S.C. § 119(e) to U.S. Provisional Patent Application No. 62/160,101, titled "WIRING INTERFACE FOR FLUID SENSORS," filed on May 12, 2015. Each of these related applications is hereby incorporated herein by reference in its entirety.

BACKGROUND

Technical Field

Examples disclosed herein relate generally to wiring interfaces for sensors, and more specifically to wiring interfaces for sensors that monitor fluid stored in physically proximal storage compartments.

Discussion

Tanker trailers are towed by trucks and store fluids (e.g., gasoline) in multiple compartments that are generally filled from the bottom. For safety reasons, overfill sensors are placed in each compartment to detect potential overfills and provide a signal indicative of the fluid level in a given compartment. The signals provided by the overfill sensors are monitored by a separate monitoring device to identify imminent overfills and to prevent their occurrence.

The overfill sensors are wired to the monitoring device by a backbone cable loom. A conventional backbone cable loom 100 is illustrated in FIG. 1. The backbone cable loom 100 includes a monitor connector 102, main cables 106, overmolded junctions 108, sensor cables 110, and sensor connectors 104. The monitor connector 102 couples the monitoring device to overfill sensors via the main cables 106, the overmolded junction 108, the sensor cables 110, and the sensor connectors 104. The overmolded junctions 108 each contain a unique set of wire junctions, generally made by hand, that make connections between the main cables 106 and each sensor cable 110 for each particular sensor connector 104. The particular configuration of the wire junctions in an overmolded junction 108 varies based on, for example, the type of overfill sensor being used and the location of the overfill sensor in the tanker trailer (e.g., compartment #1 as opposed to compartment #3). These wire junctions are overmolded to protect the wire junctions from the external environment. The length of any of the main cables 106 and sensor cables 110 in the backbone cable loom 100 varies significantly with the particular size of the tanker trailer, the number of compartments in the tanker trailer, and the shape of the tanker trailer.

Tanker trailer manufacturers generally construct tanker trailers to meet customer specific requirements. Thus a tanker trailer manufacturer may make tanker trailers with over a thousand different configurations and may need to keep a similar number of unique backbone loom cable configurations in inventory incurring inventory time and expense.

SUMMARY

Aspects and examples disclosed herein present wiring interfaces and associated systems for fluid sensors that are simple to install, require less inventoried parts and expense, and interoperable with various tanker trailer configurations. For instance, some examples use wiring interfaces within a cap mounted onto a fluid sensor support member configured for installation within a compartment of a tanker trailer. In these examples, the cap covers the top of the fluid sensor and completes connections between a monitoring device and the fluid sensor, thereby eliminating the unique hand-wired overmolded wiring junctions. The wiring interfaces may have an input port and an output port, each with toolless connectors, to connect the wiring interface to other fluid sensors or a monitoring device via a standardized cable. The toolless connectors may include a screw and thread assembly where the cap includes a threaded receiver and the cable includes a screw to engage the threaded receiver in the cap. The screw on the cable may be operated without any tools (e.g., by hand). Other examples of toolless connectors that may be used include clamps, retaining rings, and other fasteners that may be operated to establish secure connections by hand. The standardized cable, by connecting each of the wiring interfaces, significantly reduces the variety of cable lengths that a particular manufacturer must keep in inventory for a given number of tanker trailer configurations. Accordingly, the wiring interfaces and associated systems disclosed herein reduce the cable inventory, costs, and complexity of installing fluid sensor systems on tanker trailers.

In some examples, the caps described herein house and protect fluid sensors and their physical and electrical connections from environmental hazards encountered by tanker trailers. These hazards may include severe weather, flames, physical contact, and other hazards to which tanker trailers are exposed while traveling outdoors, receiving fluid contents, or sitting idle. The caps are also an integral part of an overall fluid sensor system that must meet rigorous safety standards set by local, state, and federal governments. Among other requirements, the overall sensor system must isolate electricity from fluid and fluid vapors to ensure that volatile fluid, such as petroleum products, will not ignite due to the presence of the sensor system. The standard BS EN 13922:2011, published September 2011, is hereby incorporated herein by reference in its entirety and describes the specifications for the fluid sensors according to at least one embodiment.

In one embodiment, a cap for a fluid sensor is provided. The cap includes a cap input port including a first toolless connector configured to removably couple to a first cable and a cap output port including a second toolless connector configured to removably couple to a second cable.

The cap may further include an interface circuit including a circuit input port coupled to the cap input port and a circuit output port coupled to the cap output port. The circuit input port may include a plurality of input terminals. The plurality of input terminals may include 7 input terminals. The circuit output port may include a plurality of output terminals. The plurality of output terminals may include 7 output terminals.

The first toolless connector may be configured to removably couple the circuit input port to the first cable and the second toolless connector may be configured to removably couple the circuit output port to the second cable. The interface circuit may include a sensor port including a toolless connector configured to electrically couple to the fluid sensor. The sensor port may include a plurality of sensor terminals. The plurality of sensor terminals may include at least one of two-wire sensor terminals and five-wire sensor terminals.

The plurality of sensor terminals may include a sensor signal terminal. The interface circuit may couple the sensor signal terminal to a first output terminal of the plurality of output terminals. The interface circuit may couple a first input terminal of the plurality of input terminals to a second output terminal of the plurality of output terminals. The plurality of input terminals may include a first pulse out terminal. The plurality of output terminals may include a second pulse out terminal directly coupled to the first pulse out terminal.

The cap may further include a dummy plug configured to couple the first pulse out terminal to the second pulse out terminal. The cap may further include a mounting bracket configured to mount the cap to a tanker trailer. The cap may further include the first cable and the second cable.

In another embodiment, a fluid sensor and cap assembly is provided. The assembly includes a fluid sensor, a sensor mounting member housing the fluid sensor, and a cap for the fluid sensor and the sensor mounting member. The cap includes a cap input port and a cap output port. The cap input port includes a first toolless connector configured to removably couple to a first cable. The cap output port includes a second toolless connector configured to removably couple to a second cable.

In the assembly, the fluid sensor may be configured to detect petroleum products. The assembly may further include an interface circuit including a circuit input port, a circuit output port, and a sensor port configured to couple to the fluid sensor. The first toolless connector may be configured to removably couple the circuit input port to the first cable. The second toolless connector may be configured to removably couple the circuit output port to the second cable. The assembly may further include the first cable and the second cable.

In another embodiment, a fluid sensor wiring system is provided. The fluid sensor wiring system includes a cap for a fluid sensor. The cap includes a cap input port and a cap output port. The cap input port including a first toolless connector configured to removably couple to a first cable. The cap output port includes a second toolless connector configured to removably couple to a second cable.

The fluid sensor wiring system may include the second cable and a monitor coupled to the cap via the second cable. The second cable may include 7 wires. The fluid sensor wiring system may further include a plurality of caps including the cap, a plurality of cables including the first cable and the second cable, a plurality of interface circuits included within the plurality of caps, and a plurality of fluid sensors including the fluid sensor. Each interface circuit of the plurality of interface circuits may include a circuit input port, a circuit output port, and a sensor port configured to couple to one fluid sensor of the plurality of fluid sensors.

In the fluid sensor wiring system, the sensor port of each interface circuit may include at least one of two-wire sensor terminals and five-wire sensor terminals. The sensor port of each interface circuit may include a sensor signal terminal. The monitor may include a plurality of monitor terminals. Each monitor terminal of the plurality of monitor terminals may be coupled to a sensor signal terminal of a sensor port of a respective interface circuit of the plurality of interface circuits via one or more cables of the plurality of cables.

The circuit output port of the interface circuit included within the cap may include a plurality of output terminals. The circuit input port of the interface circuit may include a plurality of input terminals. The interface circuit may couple the sensor signal terminal of the sensor port of the interface circuit to a first output terminal of the plurality of output terminals. The interface circuit may couple a first input terminal of the plurality of input terminals to a second output terminal of the plurality of output terminals.

The circuit input port of each interface circuit may include a first pulse out terminal. The circuit output port of each interface circuit may include a second pulse out terminal directly coupled to the pulse out terminal of the circuit input port. In the fluid sensor wiring system, a circuit input port of an interface circuit of the plurality of interface circuits may include a pulse out terminal and a pulse in terminal and the fluid sensor wiring system may further include a dummy plug configured to couple the pulse out terminal to the pulse in terminal.

Still other aspects, examples, and advantages of these exemplary aspects are discussed in detail below. Moreover, it is to be understood that both the foregoing information and the following detailed description are merely illustrative examples of various aspects, and are intended to provide an overview or framework for understanding the nature and character of the claimed subject matter. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

Furthermore, in the event of inconsistent usages of terms between this document and documents incorporated herein by reference, the term usage in the incorporated references is supplementary to that of this document; the term usage in this document controls. In addition, the accompanying drawings are included to provide illustration and a further understanding of the various aspects and examples, and are incorporated in and constitute a part of this specification. The drawings, together with the remainder of the specification, serve to explain principles and operations of the described and claimed aspects and examples.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

The following examples describe wiring interfaces and associated systems for fluid sensors (e.g., fluid level sensors) that are interoperable with various tanker trailer configurations and that are easy to install. For instance, some examples disclosed herein manifest an appreciation that any given tanker trailer manufacturer may produce thousands of different tanker trailer configurations to meet the needs of their customers. Accordingly, some examples disclosed herein include wiring interfaces built into a cap covering the fluid sensor that connects to, for example, a monitoring device with standardized cables to substantially simplify the installation of fluid sensor systems on tanker trailers.

The examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the systems and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
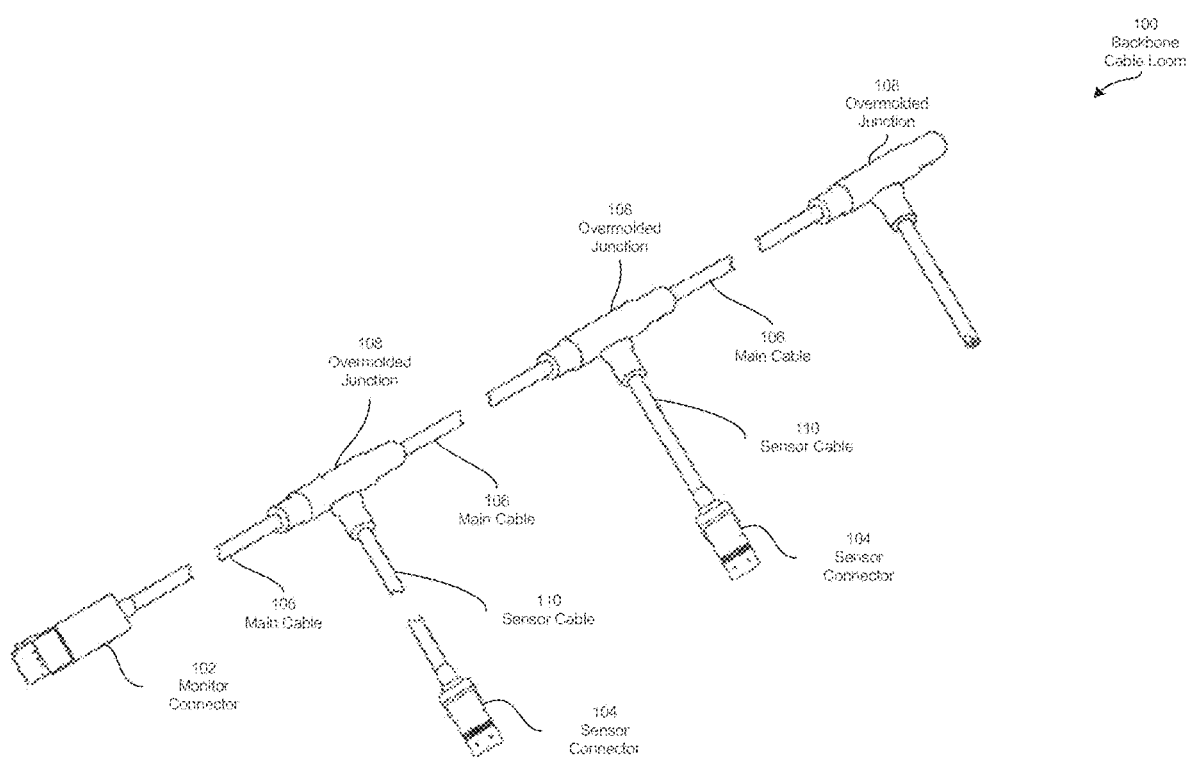
FIG. 1 is an illustration of a conventional backbone cable loom.
Figure 2A:
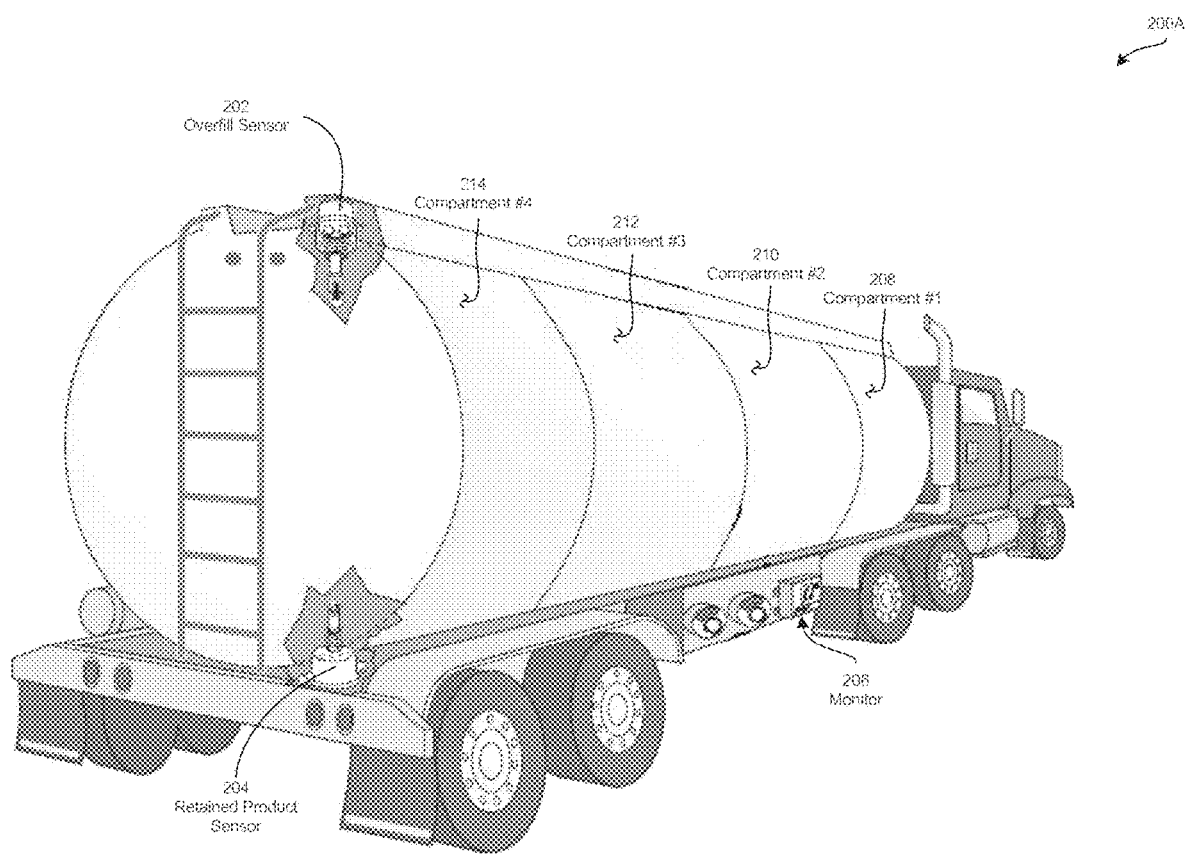
FIGS. 2A and 2B are illustrations of example tanker trailers in accordance with embodiments of the present disclosure.
Figure 2B:
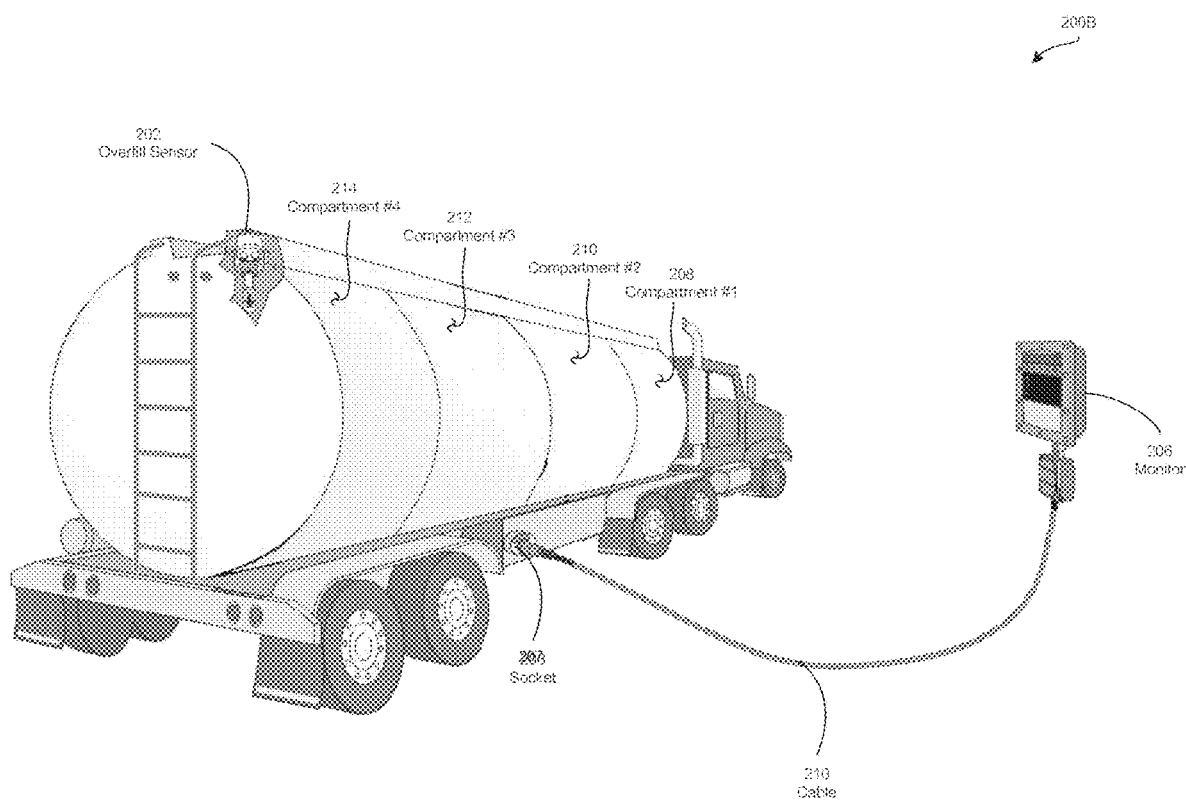

Various examples disclosed herein include wiring interfaces and associated systems for fluid sensors on tanker trailers. FIG. 2A illustrates an example tanker trailer 200A suitable for transporting fluids including, for example, gasoline and other petroleum products. As shown in FIG. 2A, the tanker trailer 200A includes an overfill sensor 202, a retained product sensor 204, a monitor 206, and a set of compartments 208, 210, 212, and 214. Each compartment of the set of compartments 208, 210, 212, and 214 is constructed to store fluid. Each of these compartments 208, 210, 212, and 214 has an overfill sensor, such as the overfill sensor 202, and a retained product sensor, such as the retained product sensor 204. The overfill sensor 202 provides a signal indicative of whether a compartment is filled with fluid, and the retained product sensor 204 provides a signal indicative of whether the compartment is empty. The overfill sensor 202 and/or the retained product sensor 204 may be in communication with the monitor 206 (e.g., via electrical wires). The monitor 206 processes the signals received from the overfill sensors and/or the signals received from the retained product sensors to variously detect potential compartment overfills and empty compartments. It is appreciated that other tanker trailer configurations may be employed. For example, the tanker trailer may omit retained product sensors 204 and/or monitor 206 as illustrated by tanker trailer 200B in FIG. 2B. In cases where the monitor 206 is not mounted on the tanker trailer, the tanker trailer 200B includes a socket 207 that is connected to the overfill sensor 202 in each of the compartments 208, 210, 212, and 214. The socket 207 is configured to connect, via the cable 210, to an off-board monitor 206 that is, for example, mounted on a loading rack.

The overfill sensor 202 and the retained product sensor 204 may be, for example, two-wire sensors or five-wire sensors. Two-wire sensors communicate in parallel with a monitoring device (e.g., the monitor 206) via a signal/power wire and a ground wire (i.e., by two wires). A monitoring device receiving signals from a set of two-wire sensors may have a dedicated input terminal for the signal wire from each two-wire sensor and a common ground terminal for all of the two-wire sensors. Five-wire sensors communicate in series with the external monitoring device via a set of 5 wires including (1) a pulse out wire, (2) a power wire, (3) a ground wire, (4) a diagnostic wire, and (5) a pulse in wire. A monitoring device receiving signals from a set of five-wire sensors may have a power terminal, a ground terminal, and a diagnostic terminal each coupled to the same respective terminal on five-wire sensors. The monitoring device may have a pulse out terminal connected to the pulse in terminal of the first five-wire fluid sensor in the chain and a pulse in terminal connected to the pulse out terminal of the last five-wire fluid sensor in the chain.

Figure 3:
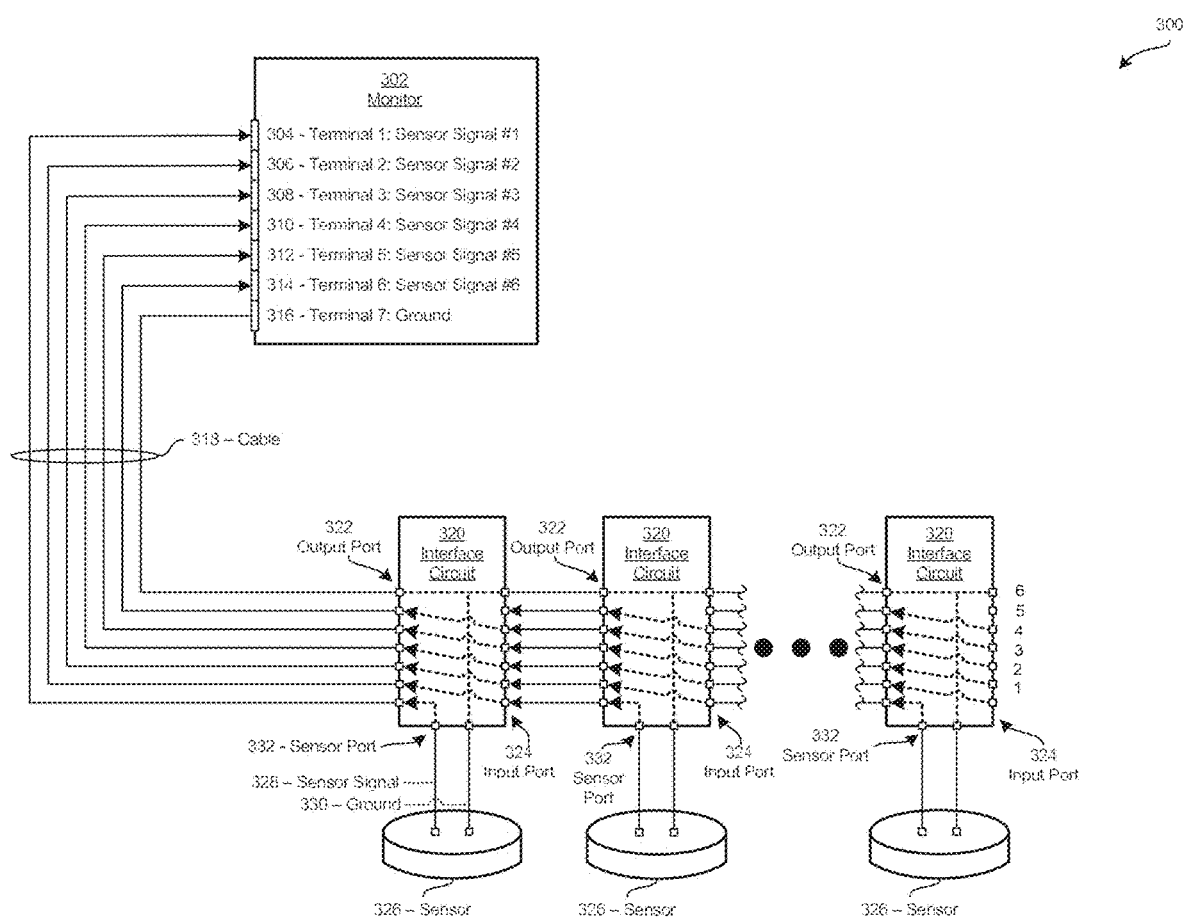
FIG. 3 is a schematic of an example wiring system including fluid sensor wiring interfaces for two-wire fluid sensors in accordance with an embodiment of the present disclosure.

In some examples, the connections between a given sensor and the monitoring device are made by interface circuits installed within protective covers, or caps, mounted on top of the fluid sensors. The sensor wiring system 300 in FIG. 3 illustrates an example set of interface circuits suitable for connecting up to six two-wire fluid sensors to a monitoring device. As shown, the sensor wiring system 300 includes a monitor 302, a cable 318, a plurality of two-wire interface circuits 320, and a plurality of two-wire sensors 326. Each of the interface circuits 320 connects a signal wire 328 and a ground wire 330 of one of the two-wire sensors 326 to a corresponding terminal on the monitor 302 via the cable 318. The cable 318 also connects the interface circuits 320 to one another. The cable 318 may include a plurality of segments and may be, for example, a seven-wire point-to-point cable. The monitor 302 includes a ground terminal 316 and six terminals 304, 306, 308, 310, 312, and 314 ("monitor terminals") to receive signals from up to six two-wire sensors.

The interface circuits 320 each have an input port 324 (a "circuit input port") and an output port 322 (a "circuit output port"). Each of the ports 322 and 324 has seven terminals ("output terminals" and "input terminals", respectively) including a sensor signal terminal (one of sensor signal terminals 1-6) for each of six sensor signals and a ground terminal. The interface circuits 320 further include a sensor port 332 to connect to the sensor 326 to the interface circuit 320. The sensor port 332 includes sensor terminals (i.e., a ground terminal for the ground 330 and a sensor signal terminal for the sensor signal 328). As illustrated in FIG. 3, each interface circuit 320 connects the ground terminal of the sensor port 332 to the ground terminal of the output port 322 and the ground terminal of the input port 324. Each interface circuit 320 connects the sensor signal terminal of the sensor port 332 to the first sensor signal terminal of the output port 322. In addition, each interface circuit 320 cross-connects each sensor signal terminal of the input port 324 to a sensor signal terminal of the output port 322 having an ordinal value within the output port that is one greater than the ordinal value of the sensor signal terminal in the input port. These cross-connections effectively shift up sensor signal terminals in the output port 322 relative to the input port 324 by an ordinal value of one. Consequently, sensor signal terminal 1 of the input port 324 is connected to sensor signal terminal 2 of the output port 322 and sensor signal terminal 6 of the input port 324 is not connected to a terminal of the output port 322. In some cases, the cable 318 includes connectors that permit the cable 318 to be connected to and disconnected from the output ports 322 and/or the monitor 302. For instance, the illustrated wiring configuration of the interface circuit 320 ties each sensor 326 (up to six in some embodiments) to a corresponding terminal on the monitor 302 without hand-wiring any junctions. In addition, the interface circuits 320 for each of the sensors 326 may be identical for any two-wire sensor configuration on a tanker trailer having six or fewer sensors. In addition, segments of the cable 318 may have an identical construction (apart from their lengths).

Figure 4:
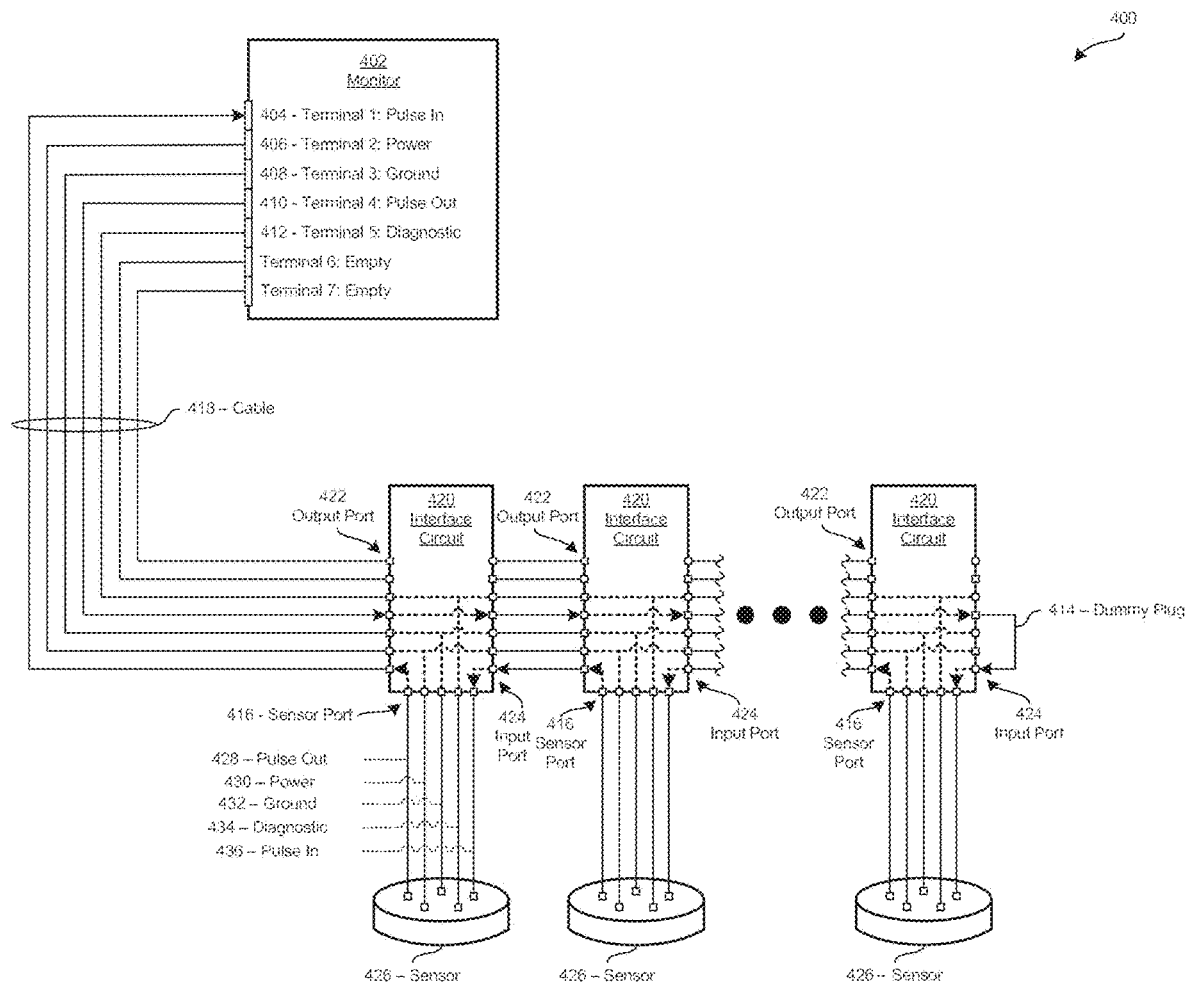
FIG. 4 is a schematic of an example wiring system including fluid sensor wiring interfaces for five-wire fluid sensors in accordance with an embodiment of the present disclosure.

In some examples, a similar wiring system is provided to connect five-wire sensors to a monitoring device. FIG. 4 illustrates an example sensor wiring system 400 suitable for connecting five-wire sensors to a monitoring device. As shown, the five-wire sensor wiring interface 400 includes a monitor 402, a cable 418, a plurality of interface circuits 420, and a plurality of five-wire sensors 426. The interface circuit 420 for each five-wire sensor 426 connects the five-wire sensor 426 to the monitor 402 via the cable 418. The cable 418 also connects the interface circuits 420 to one another. The cable 418 may include a plurality of segments and may be, for example, a seven-wire straight cable. The monitor 402 includes a pulse in terminal 404, a power terminal 406, a ground terminal 408, a pulse out terminal 410, and a diagnostic terminal 412. It is appreciated that the cable 418 illustrated in FIG. 4 may be identical to the cable 318 illustrated in FIG. 3 and, therefore, interoperable between two-wire and five-wire sensor wiring systems.

The interface circuits 420 each have an input port 424 (a "circuit input port"), an output port 422 (a "circuit output port"), and a sensor port 416. The input port 424 includes a plurality of input terminals. The output port 422 includes a plurality of output terminals. The sensor port includes a plurality of sensor terminals. As illustrated in FIG. 4, each interface circuit 420 connects the power terminal, the ground terminal, and the diagnostic terminal of the sensor port 416 to the power terminals, the ground terminals, and the diagnostic terminals, respectively, of the output port 422 and the input port 424. Each interface circuit 420 directly connects the pulse out terminal of the input port 424 to the pulse out terminal of the output port 422 to pass along the signal from the monitor 402 to the last interface circuit 420 in the chain. At the last interface circuit 420 in the chain, a dummy plug 414 connects the pulse out terminal to the pulse in terminal of the input port 424. The dummy plug 414 may be connected to the interface circuit 420 by a similar toolless connector used to connect segments of the cable 418 to interface circuits 420.

Each interface circuit 420 connects the pulse in terminal on the input port 424 to the pulse in terminal of the sensor port 416 and consequently the pulse in line 436 of the sensor 426. In addition, each interface circuit 420 connects the pulse out terminal of the sensor port 416 (which is connected to the pulse out line 428) to the pulse in terminal of the output port 422. In some cases, the cable 418 includes connectors that permit the cable 418 to be connected to and disconnected from the output ports 422 and/or the monitor 402. For instance, connecting the pulse-out terminal of the sensor port 416 to the pulse in port of the output port 422, in combination with using the dummy plug 414, connects the five-wire sensors 426 in series without making any wire junctions by hand.

Figure 5:
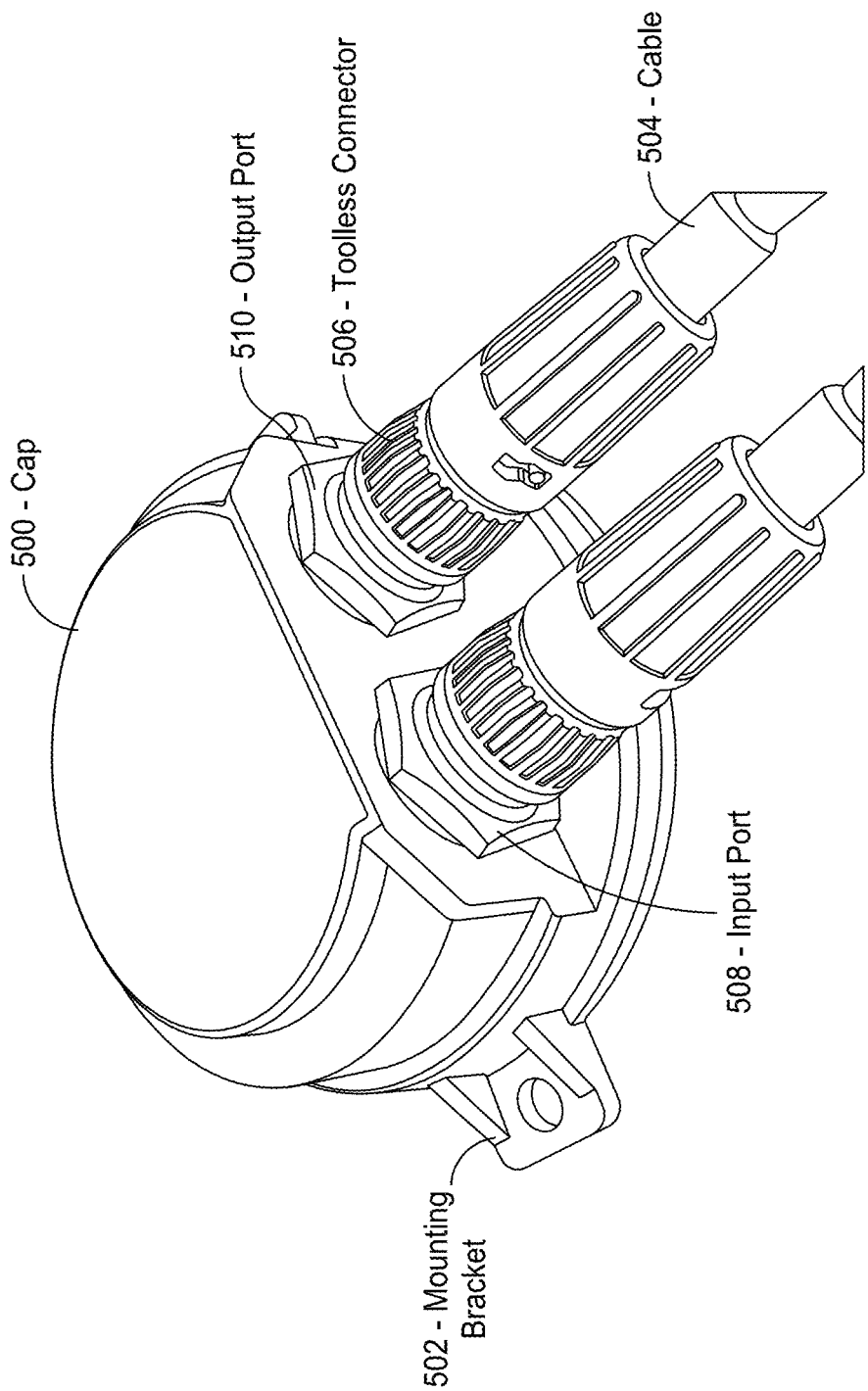
FIG. 5 is an illustration of an example fluid sensor cap in accordance with an embodiment of the present disclosure.

Each of the interface circuits 420 in FIG. 4 and interface circuits 320 in FIG. 3 may be disposed within a cap installed on the tanker trailer covering the top of a fluid sensor. An example cap 500 is illustrated in FIG. 5, which also illustrates a mounting bracket 502 and a cable 504 (e.g., the cable 318 described above with reference to FIG. 3). The cap 500 includes an input port 508 (a "cap input port") and an output port 510 (a "cap output port") each constructed to removably couple to connectors of the cable segments 504 by each toolless connector 506. The toolless connector 506 may include a screw and thread assembly where the cap 500 includes a threaded receiver and the cable 504 includes a screw to engage the threaded receiver in the cap 500. The screw on the cable 504 may be operated without any tools (e.g., by hand). It is appreciated that other types of toolless connectors may be used as the toolless connector 506. Examples of toolless connectors that may be used include clamps, retaining rings, and other fasteners. The cap 500 may be installed on a sensor mounting member by the mounting bracket 502. As illustrated, the mounting bracket 502 includes apertures through which bolts may be inserted, thereby mounting the cap 500 to the tanker trailer and covering the fluid sensor.

Figure 6:
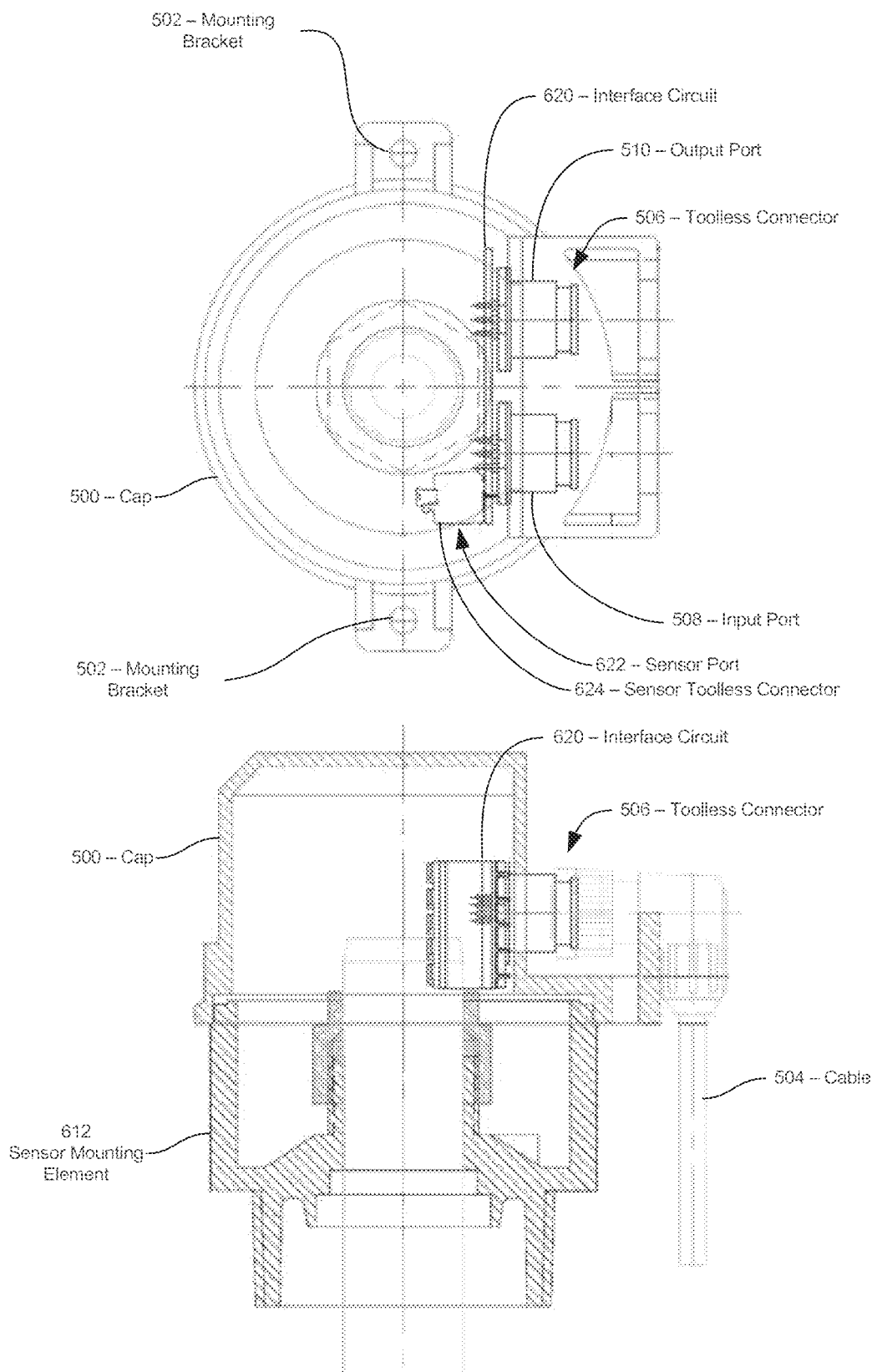
FIG. 6 is a schematic of an example fluid sensor cap in accordance with an embodiment of the present disclosure.

FIG. 6 provides another illustration of the cap 500, which also illustrates a sensor mounting member 612. When mounted to a compartment of a tanker trailer, the sensor mounting member 612 and the fluid sensor create a vapor tight seal between the environment inside the compartment and the environment outside the compartment. The cap 500 includes the input port 508 and the output port 510 each constructed to removably couple to connectors of the cable segments 504 by toolless connector 506. Both the input port 508 and the output port 510 are connected to an interface circuit 620 (e.g., either the interface circuit 320 described above with reference to FIG. 3 or the interface circuit 420 described above with reference to FIG. 4). In one example, the interface circuit 620 is implemented as a printed circuit board (PCB) installed within the cap 500 directly behind the ports 508 and 510. As described above with reference to either FIG. 3 or FIG. 4, the interface circuit 620 makes the connections between the input port 508 and the output port 510 in addition to making the connections available, via a sensor port 622, to a fluid sensor mounted in the sensor mounting member 612. The sensor port 622 may include a sensor toolless connector 624. The sensor toolless connector 624 may be, for example, a spring-loaded pincher terminal with conductive plates that pinch a sensor wire to hold it in place. The cap 500 also includes the mounting bracket 502 to mount the cap 500 to a sensor mounting member 612 on a tanker trailer covering the top of a fluid sensor. It is appreciated that the cap 500 may be constructed to mount over retained product sensors on the bottom of the tanker trailer and/or overfill sensors on the top of the tanker trailer. For example, the height of the cap 500 may be decreased for retained product sensors to reduce the likelihood of the cap 500 being damaged on the bottom of the tanker trailer by an object.

Figure 7:
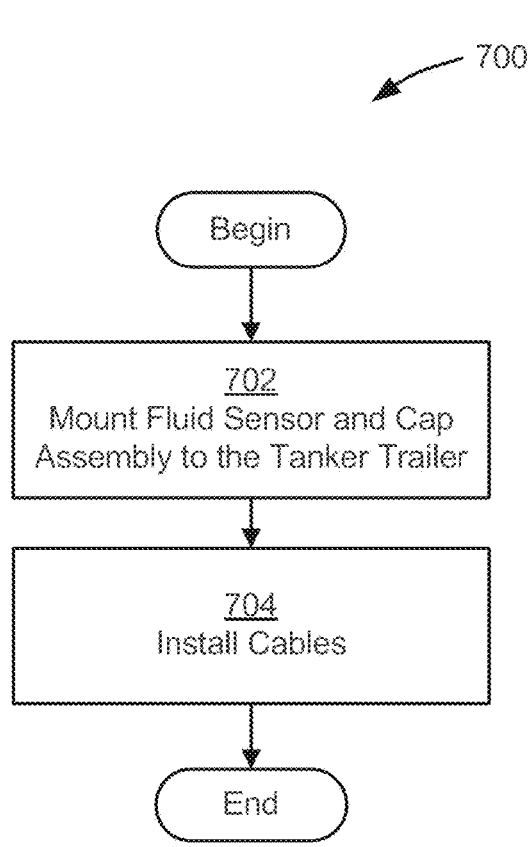
FIG. 7 is a flow diagram of an example method of installation in accordance with an embodiment of the present disclosure.

In some examples, the cap may be removably attached to a fluid sensor and fluid sensor mounting member and distributed to truck trailer manufacturers as a fluid sensor and cap assembly. Distributing the cap to truck trailer manufacturers as a fluid sensor and cap assembly further simplifies fluid sensor system installation as illustrated by installation process 700 in FIG. 7. As shown, the installation process 700 includes an act 702 of mounting a fluid sensor and cap assembly to the tanker trailer and an act 704 of installing cables. The installation process begins at the act 702.

In the act 702, the fluid sensor and cap assembly are mounted to the tanker trailer. For example, the fluid sensor and cap assembly may be mounted to a sensor mounting member (e.g., the sensor mounting member 612 described above with reference to FIG. 6) attached or integral to the tanker trailer. The fluid sensor and cap assembly may be mounted to the tanker trailer by various mechanisms and fasteners. For example, the cap may include a mounting bracket (e.g., mounting bracket 502) including an aperture through which a bolt may be inserted through to mount the fluid sensor and cap assembly to the tanker trailer.

In the act 704, cables are installed between the caps and the monitor. As illustrated above with reference to FIGS. 3 and 4, a plurality of cable segments may be installed connecting the caps of the fluid sensor and cap assemblies in a chain and connecting each fluid sensor and cap assembly in the chain to a monitor or a socket constructed to receive a cable connected to a monitor (e.g., the socket 207 described above with reference to FIG. 2A). The cables may be coupled to the caps by a toolless connector including, for example, a toolless screw and thread mechanism. It is appreciated that the act 704 of installing the cables may also include installing a dummy plug (e.g., dummy plug 414 described above with reference to FIG. 4) in five-wire sensor systems. After completion of the act 704, the installation process 700 ends.

Figure 8:
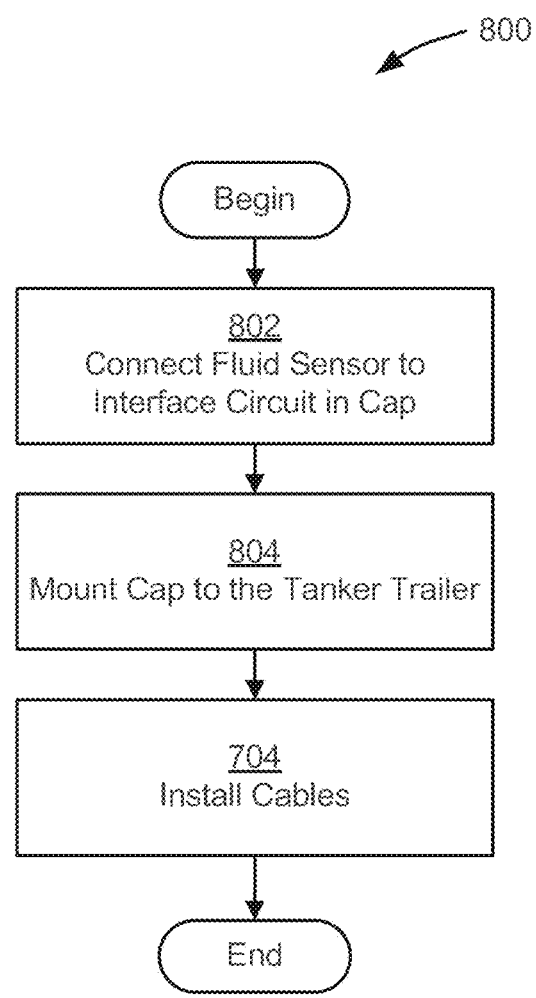
FIG. 8 is a flow diagram of another example method of installation in accordance with an embodiment of the present disclosure.

Truck trailer wiring systems for fluid sensors may need to be replaced after initial installation to upgrade an existing system or replace a malfunctioning system. In these scenarios, the cap alone (without the fluid sensor) and associated cables may be installed to existing fluid sensors as illustrated by the installation process 800 in FIG. 8. As shown, the installation process 800 includes an act 802 of connecting the fluid sensor to the interface circuit in the cap, an act of mounting the cap to the tanker trailer 804, and an act of installing the cable 704. The installation process 800 begins at the act 802.

In the act 802, the fluid sensor is connected to the interface circuit in the cap. For example, one or more wire connections may be installed between the terminals on the fluid sensor and the terminals on the interface circuit. The wires connecting the fluid sensor to the interface circuit may be connected to the interface circuit via one or more toolless connectors including, for example, a spring-loaded pincher terminal.

In the act 804, the cap is mounted to the tanker trailer. For example, the cap may be mounted to a sensor mounting member (e.g., the sensor mounting member 612 described above with reference to FIG. 6) on the tanker trailer. The cap may be mounted to the tanker trailer by various mechanisms and fasteners. For example, the cap may include a mounting bracket (e.g., the mounting bracket 502 described above with reference to FIG. 5) including an aperture through which a bolt may be inserted through to mount the cap to the tanker trailer.

The act 704 of the installation process 800 includes some or all of the elements of the act 704 of the installation process 700 described above. After completion of the act 704, the installation process 800 ends.

Each of the processes disclosed herein depicts one particular sequence of acts in a particular example. Some acts are optional and, as such, may be omitted in accord with one or more examples. Additionally, the order of acts can be altered, or other acts can be added, without departing from the scope of the systems and methods discussed herein.

Having thus described several aspects of at least one example of this disclosure, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

The invention claimed is:

1. A cap for a fluid sensor, the cap comprising:
   a cap input port including a first toolless connector configured to removably couple to a first cable, the input port comprising a plurality of input terminals;
   a cap output port including a second toolless connector configured to removably couple to a second cable, the cap output port comprising a plurality of output terminals;
   a sensor port including a third toolless connector configured to removably couple to the fluid sensor, the sensor port comprising a plurality of sensor terminals; and
   a printed circuit board comprising a plurality of connections coupling each of the plurality of sensor terminals to at least one of the plurality of input terminals or the plurality of output terminals, wherein the plurality of connections are configured such that
      at least a portion of the plurality of input terminals are connected to at least a portion of the sensor terminals to transfer a signal received via the first cable to the fluid sensor, and
      at least a portion of the plurality of output terminals are connected to at least a portion of the plurality of sensor terminals such that a sensor signal generated by the fluid sensor is transferred from the fluid sensor to the second cable.

2. The cap of claim 1, further comprising an interface circuit including a circuit input port coupled to the cap input port and a circuit output port coupled to the cap output port, wherein the first toolless connector is configured to removably couple the circuit input port to the first cable and the second toolless connector is configured to removably couple the circuit output port to the second cable.

3. The cap of claim 2, wherein the interface circuit comprises the printed circuit board.

4. The cap of claim 2, wherein the circuit input port includes the plurality of input terminals and the circuit output port includes the plurality of output terminals.

5. The cap of claim 2, wherein the plurality of sensor terminals includes a sensor signal terminal, the interface circuit couples the sensor signal terminal to a first output terminal of the plurality of output terminals and the interface circuit couples a first input terminal of the plurality of input terminals to a second output terminal of the plurality of output terminals.

6. The cap of claim 1, wherein the plurality of sensor terminals comprises at least one of two-wire sensor terminals and five-wire sensor terminals.

7. The cap of claim 1, wherein the plurality of input terminals includes seven-wire input terminals and the plurality of output terminals includes seven-wire output terminals.

8. The cap of claim 1, wherein the plurality of output terminals includes a first pulse out terminal and a return pulse terminal directly coupled to the first pulse out terminal.

9. The cap of claim 8, further comprising a dummy plug configured to couple the first pulse out terminal to return pulse terminal.

10. A fluid sensor and cap assembly comprising:
    a fluid sensor comprising at least one of a two-wire fluid sensor and a five-wire fluid sensor;
    a sensor mounting member housing the fluid sensor; and
    a cap comprising:
        a cap input port including a first toolless connector configured to removably couple to a first cable, the input port comprising a plurality of input terminals,
        a cap output port including a second toolless connector configured to removably couple to a second cable, the cap output port comprising a plurality of output terminals,
        a sensor port including a third toolless connector configured to removably couple to the fluid sensor, the sensor port comprising a plurality of sensor terminals, and
        a printed circuit board comprising a plurality of connections coupling each of the plurality of sensor terminals to at least one of the plurality of input terminals or the plurality of output terminals, wherein the plurality of connections are configured such that
            at least a portion of the plurality of input terminals are connected to at least a portion of the sensor terminals to transfer a signal received via the first cable to the fluid sensor, and
            at least a portion of the plurality of output terminals are connected to at least a portion of the plurality of sensor terminals such that a sensor signal generated by the fluid sensor is transferred from the fluid sensor to the second cable.

11. The fluid sensor and cap assembly of claim 10, further comprising an interface circuit including a circuit input port, a circuit output port, and a sensor port configured to couple to the fluid sensor, wherein the first toolless connector is configured to removably couple the circuit input port to the first cable and the second toolless connector is configured to removably couple the circuit output port to the second cable.

12. The fluid sensor and cap assembly of claim 11, wherein the interface circuit comprises the printed circuit board.

13. The fluid sensor and cap assembly of claim 10, further comprising:
    the first cable; and
    the second cable.

14. A fluid sensor wiring system comprising:
    a plurality of fluid sensor assemblies, each of the plurality of fluid sensor assemblies comprising
        a fluid sensor comprising at least one of a two-wire fluid sensor and a five-wire fluid sensor,
        a sensor mounting member housing the fluid sensor, and
        a cap comprising
            a cap input port including a first toolless connector configured to removably couple to a first cable of a plurality of first cables, the input port comprising a plurality of input terminals,
            a cap output port including a second toolless connector configured to removably couple to of at least one the first cable of the plurality of first cables and a second cable, the cap output port comprising a plurality of output terminals,
            a sensor port including a third toolless connector configured to removably couple to the fluid sensor, the sensor port comprising a plurality of sensor terminals, and
            a printed circuit board comprising a plurality of connections coupling each of the plurality of sensor terminals to at least one of the plurality of input terminals or the plurality of output terminals, wherein the plurality of connections are configured such that
                at least a portion of the plurality of input terminals are connected to at least a portion of the sensor terminals to transfer a signal received via the first cable of the plurality of first cables to the fluid sensor, and
                at least a portion of the plurality of output terminals are connected to at least a portion of the plurality of sensor terminals such that a sensor signal generated by the fluid sensor is transferred from the fluid sensor to the second cable; and
    the plurality of first cables.

15. The fluid sensor wiring system of claim 14, further comprising:
    the second cable; and
    a monitor coupled to the at least one of the plurality of fluid sensor assemblies via the second cable.

16. The fluid sensor wiring system of claim 14, the cap further comprising an interface circuit including a circuit input port coupled to the cap input port and a circuit output port coupled to the cap output port, wherein the first toolless connector is configured to removably couple the circuit input port to the first cable and the second toolless connector is configured to removably couple the circuit output port to the second cable.

17. The fluid sensor wiring system of claim 16, wherein the interface circuit comprises the printed circuit board.

18. The fluid sensor wiring system of claim 14, wherein the each of the plurality of fluid sensor assemblies includes a pulse out terminal and a return pulse terminal directly coupled to the pulse out terminal.

19. The cap of claim 18, further comprising a dummy plug configured to couple the pulse out terminal to the return pulse terminal.

* * * * *